Patented Aug. 27, 1946

2,406,621

UNITED STATES PATENT OFFICE 2,406,621

METHOD OF PREPARING POLYSILOXANE RESINS

James Marsden, Schenectady, N. Y., assignor to General Electric Company, a corporation of New York No Drawing. Application February 12, 1944, Serial No. 522,085

8 Claims. (Cl. 260—2)

This invention relates to a method of preparing heat-hardenable polysiloxane resins frequently called silicone resins. It is particularly concerned with an improved method of hydrolyzing methyl silicon chlorides, i. e., methyl chloro derivatives of silane, including mixtures thereof with silicon tetrachloride, to form heat-hardenable products.

The application of Robert O. Sauer, Serial No. 455,617, filed August 21, 1942, and assigned to the same assignee as the present invention, describes and claims a process of hydrolyzing organo-silicon halides, including mixtures thereof, with silicon tetrahalides, which process comprises forming a solution of the organo-silicon halides in an inert, nonalcoholic organic solvent such as toluene and adding the resultant product to a hydrolyzing medium comprising a mixture of water and a liquid aliphatic alcohol containing at least four, but not more than eight carbon atoms, such as n-butanol. The amount of water present in the hydrolyzing medium is preferably considerably in excess of that calculated as necessary to hydrolyze the silicon halide. As a result, there is obtained as a by-product of the Sauer process a dilute solution of hydrochloric acid containing from 15 to 20 per cent, ordinarily about 17 to 18 per cent, by weight of hydrogen chloride and some of the solvents, such as n-butanol and toluene, used in the hydrolysis process.

In the commercial production of silicone resins by the process of the Sauer application, using water as a hydrolyzing medium, the disposal of the dilute acid phase formed as a result of the hydrolysis represents a serious problem. While there is a limited use for such dilute solutions of hydrochloric acid, the solvents dissolved therein represent an appreciable economic loss.

The present invention is based on my discovery that the hydrolysis of mixtures of methyl chlorosilanes (which term as used generally herein is intended to include mixtures of methyl chlorosilanes with silicon tetrachloride) containing sufficient chlorine attached directly to silicon to form heat-hardenable hydrolysis products can be carried out in a saturated hydrochloric acid solution in the presence of the solvents employed in the process of the Sauer application, and that the concentrated acid phase resulting from the hydrolysis may be reused in hydrolyzing additional methyl chlorosilanes. More specifically, I have found that a mixture of methyl chlorosilanes containing an average of more than two hydrolyzable chlorine atoms per silicon atom can be converted into heat-hardenable polysiloxane resins by dissolving the mixture in an inert organic solvent, preferably an aromatic hydrocarbon solvent such as toluene, benzene, or xylene, and slowly adding the resultant solution to a two-phase hydrolyzing medium comprising an aliphatic alcohol containing from 4 to 8 carbon atoms, preferably n-butanol, an aromatic hydrocarbon solvent, and an aqueous solution of hydrochloric acid containing at least 35 per cent by weight of hydrogen chloride. The concentrated hydrochloric acid should be present in an amount exceeding that calculated as necessary to provide sufficient water to hydrolyze the chlorosilane mixture. The aqueous or acid phase resulting from the hydrolysis procedure contains upwards of 35 per cent, generally more than 40 per cent, hydrogen chloride in addition to some of the alcohol and aromatic hydrocarbon solvent in amounts corresponding to their solubilities in such acid solutions. This phase can be continually reused in subsequent hydrolyses generally with the addition of some make-up water, thus avoiding the loss of both solvents and acid. The large quantity of gaseous hydrogen chloride given off during the hydrolysis as a result of the fact that the hydrolysis medium is always saturated or substantially saturated with HCl may be recovered in the practically anhydrous state, in which form it is more readily usable in industry.

In order that those skilled in the art better may understand how the present invention may be carried into effect, the following illustrative examples are given:

Example 1

A three-component mixture containing 59.4 molar per cent dimethyl dichlorosilane, 22.8 molar per cent methyl trichlorosilane, and 27.8 molar per cent silicon tetrachloride was dissolved in toluene in the ratio of 90 parts of the chlorosilane mixture to 30 parts toluene. The resultant solution was slowly added through a dropping funnel to a mixture of 60 parts n-butanol, 30 parts toluene, and 300 parts concentrated hydrochloric acid contained in a 3-necked glass flask fitted with a stirrer, a thermometer, and a reflux condenser containing carbon dioxide-acetone mixture as a refrigerant. The hydrochloric acid employed in this example contained about 37 per cent by weight of hydrogen chloride. The hydrolyzing bath was not cooled by any external means during the hydrolysis of the chlorosilane. During addition of the chlorosilane solution to the hydrolysis medium the temperature of the bath slowly rose to a maximum of about 31 to 32.5° C. and thereafter gradually dropped to about 25° C. due to the evolution of gaseous hydrogen chloride. After all of the chlorosilane solution had been added, the resultant mixture was stirred for 5 minutes, allowed to separate into two layers, and the lower layer containing a 41 per cent solution of hydrogen chloride in which some butanol and toluene were dissolved was separated from the upper resinous layer comprising a solution of the silicone resin in the remaining butanol and toluene. The resinous layer was washed with 200 parts water and centrifuged to determine the gel content. Based on the weight of the resin, the amount of gel formed during hydrolysis was found to be about 0.4 per cent.

*Example 2*

A solution of 90 parts of the methyl chlorosilane mixture employed in Example 1 in 30 parts toluene was slowly added to an agitated hydrolyzing medium consisting of 60 parts butanol, 30 parts toluene, and 325.5 parts of the lower aqueous or acid layer obtained from Example 1. No differences were noted during the course of hydrolysis in Examples 1 and 2. The resinous layer was separated from the lower aqueous layer and washed with 200 parts water. The resin was found to contain about 0.6 per cent by weight of gel based on the weight of the resin.

*Example 3*

A solution of 300 parts of a methyl chlorosilane mixture having approximately the same composition as that employed in Example 1 in 100 parts toluene was slowly added to a mixture of 200 parts n-butanol, and 1188 parts of the aqueous acid phase obtained from a previous hydrolysis of methyl chlorosilanes. Fifty parts water was added to the resultant mixture and the hydrolyzed resin was separated from the aqueous phase and washed with water. The small amount of gel present therein was removed and the resin was concentrated and pre-condensed in accordance with the process described and claimed in copending application Serial No. 455,615, filed Aug. 21, 1942, in the names of James G. E. Wright and James Marsden, now Patent No. 2,389,477, issued Nov. 20, 1945, and assigned to the same assignee as the present invention. The resin base content during pre-condensation was 25 per cent. The resultant pre-condensed resin had a craze time at 300° C. of 166 hours, indicating that resins hydrolyzed in accordance with the present invention may be readily substituted for those hydrolyzed in accordance with prior processes.

On continued reuse of the acid phase formed during hydrolysis of the methyl silicon chloride, it is desirable to replace the water used up by hydrolysis of the chlorosilanes and to replace the butanol lost to the upper varnish or resin phase. Ordinarily, about 50 parts water should be added to the used hydrolysis medium for each 300 parts of chlorosilanes to be hydrolyzed. In Example 3 the water added to the hydrolysis mixture prior to separation of the resin constitutes the make-up water for the subsequent hydrolysis of additional methyl chlorosilanes. A large part of the butanol present in the resin layer can be recovered during concentration of the varnish or resin fraction.

While the above examples describe the hydrolysis of particular mixtures of methyl chlorosilanes and silicon tetrachloride, it is to be understood that the invention is not limited thereto. For example, some trimethyl silicon chloride may be present in the chlorosilane mixture and the silicon tetrachloride may be omitted therefrom provided the mixture contains sufficient hydrolyzable chlorine atoms attached directly to silicon so that on hydrolysis, a heat-hardenable methyl polysiloxane resin is obtained.

While n-butanol is the preferred alcoholic component of the hydrolysis mixture, satisfactory results may be obtained by the use of other alcohols containing from 4 to 8 carbon atoms. Examples of such alcohols are isobutyl alcohol, n-amyl alcohol, secondary amyl alcohol, isoamyl alcohol, tertiary amyl alcohol, fusel oil, 2-ethyl butyl alcohol, methyl amyl carbinol, etc.

What I claim as new and desire to secure by Letters Patent of the United States, is—

1. The method of making polysiloxane resins which comprises dissolving a mixture of methyl chlorosilanes containing an average of more than two chlorine atoms per silicon atoms in an aromatic hydrocarbon solvent and slowly adding the resultant solution to a two-phase hydrolysis medium comprising an aliphatic alcohol containing from 4 to 8 carbon atoms, an aromatic hydrocarbon solvent, and an aqueous solution of hydrochloric acid containing at least 35 per cent by weight of hydrogen chloride.

2. The method of hydrolyzing a mixture of methyl silicon chlorides and silicon tetrachloride containing an average of more than two chlorine atoms per silicon atom which comprises dissolving said mixture in an aromatic hydrocarbon solvent and slowly adding the resultant solution to a two-phase hydrolysis medium comprising a mixture of an aromatic hydrocarbon solvent, an aliphatic alcohol containing from 4 to 8 carbon atoms and a concentrated aqueous solution of hydrochloric acid.

3. The method of making polysiloxane resins which comprises forming a toluene solution of a mixture of methyl silicon chlorides and silicon tetrachloride containing an average of more than two chlorine atoms per silicon atom and hydrolyzing said mixture by slowly adding said solution to a two-phase hydrolysis medium comprising a mixture of toluene, an aliphatic alcohol containing from 4 to 8 carbon atoms, and a concentrated aqueous solution of hydrochloric acid.

4. The method of making a polysiloxane resin which comprises dissolving a mixture of dimethyldichlorosilane, methyltrichlorosilane and silicon tetrachloride in toluene, slowly adding the resultant solution to a two-phase hydrolysis medium comprising toluene, an aliphatic alcohol containing from 4 to 8 carbon atoms, and a quantity of concentrated aqueous solution of hydrochloric acid exceeding that calculated as necessary for complete hydrolysis of the chlorosilane mixture, permitting the resultant mixture to separate into two layers, separating the resin phase and thereafter washing said resin phase with water.

5. The method of making polysiloxane resins which comprises dissolving a mixture of methylchlorosilanes containing an average of more than two chlorine atoms per silicon atom in an aromatic hydrocarbon solvent and slowly adding the resultant solution to a two-phase hydrolysis medium comprising n-butanol, an aromatic hydrocarbon solvent, and an aqueous solution of hydrochloric acid containing at least 35 per cent by weight of hydrogen chloride.

6. The method of hydrolyzing a mixture containing dimethyl silicon dichloride and silicon tetrachloride which comprises dissolving said mixture in an aromatic hydrocarbon solvent and slowly adding the resultant solution to a two-phase hydrolysis medium comprising a mixture of an aromatic hydrocarbon solvent, n-butanol, and a concentrated aqueous solution of hydrochloric acid.

7. The method of making polysiloxane resins which comprises forming a toluene solution of a mixture of methyl silicon chlorides and silicon tetrachloride containing an average of more than two chlorine atoms per silicon atom and hydrolyzing said mixture by slowly adding said solution to a two-phase hydrolysis medium comprising a mixture of toluene, n-butanol, and a concentrated aqueous solution of hydrochloric acid.

8. The method of making a polysiloxane resin which comprises dissolving a mixture of dimethyldichlorosilane, methyltrichlorosilane, and silicon tetrachloride in toluene, slowly adding the resultant solution to a two-phase hydrolysis medium comprising toluene, n-butanol, and a quantity of a concentrated aqueous solution of hydrochloric acid exceeding that calculated as necessary for complete hydrolysis of the chlorosilane mixture, permitting the resultant mixture to separate into two layers, separating the resin phase and thereafter washing said resin phase with water.

JAMES MARSDEN.